US012631844B2

(12) United States Patent
    Yang et al.

(10) Patent No.:     US 12,631,844 B2
(45) Date of Patent:     May 19, 2026

(54) LENS ASSEMBLY

(71) Applicant: SAMSUNG ELECTRO-MECHANICS CO., LTD., Suwon-si (KR)

(72) Inventors: So Mi Yang, Suwon-si (KR); Jae Hyuk Huh, Suwon-si (KR); You Jin Jeong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 320 days.

(21) Appl. No.: 18/484,918

(22) Filed: Oct. 11, 2023

(65) Prior Publication Data

US 2024/0219673 A1    Jul. 4, 2024

(30) Foreign Application Priority Data

Jan. 2, 2023    (KR) ......................... 10-2023-0000402

(51) Int. Cl.
    *G02B 7/02*         (2021.01)

(52) U.S. Cl.
    CPC ..................................... *G02B 7/02* (2013.01)

(58) Field of Classification Search
    CPC .......... G02B 7/02; G02B 7/021; G02B 7/022; G02B 3/00; G02B 2003/0093; G03B 13/32; G03B 30/00; G03B 17/12; H04N 23/55; H04N 23/57
    USPC ........................................................ 359/819
    See application file for complete search history.

(56) References Cited

U.S. PATENT DOCUMENTS

| | | | | |
|---|---|---|---|---|
| 7,430,368 B2 * | 9/2008 | Lee | ........................... | G02B 7/04 |
| | | | | 348/240.99 |
| 9,400,383 B2 * | 7/2016 | Liang | ................. | G02B 27/0025 |
| 2009/0073582 A1 * | 3/2009 | Lee | ......................... | G02B 7/022 |
| | | | | 359/819 |
| 2010/0226023 A1 * | 9/2010 | Lee | ........................... | G02B 7/02 |
| | | | | 359/819 |
| 2010/0290137 A1 * | 11/2010 | Lin | ......................... | G02B 7/021 |
| | | | | 359/819 |
| 2011/0063739 A1 * | 3/2011 | Hirata | .................... | G02B 7/023 |
| | | | | 359/819 |
| 2011/0075276 A1 * | 3/2011 | Lin | ......................... | H04N 23/55 |
| | | | | 359/811 |
| 2017/0205637 A1 * | 7/2017 | Nagayama | ............ | F16B 11/006 |

(Continued)

FOREIGN PATENT DOCUMENTS

| | | |
|---|---|---|
| CN | 215494296 U | 1/2022 |
| KR | 10-2357534 B1 | 2/2022 |

(Continued)

*Primary Examiner* — William R Alexander
(74) *Attorney, Agent, or Firm* — NSIP Law

(57)         ABSTRACT

A lens assembly includes a plurality of lenses including an anti-rotation lens having a flange portion extending along at least a portion of a circumference of the anti-rotation lens, wherein the flange portion includes a first inclined outer surface extending in a first direction from a first outer point on a side surface of the flange portion and a second inclined outer surface extending in a second direction different from the first direction from the first outer point; and a lens barrel configured to accommodate the plurality of lenses, the lens barrel including a first coupling portion configured to contact the first inclined outer surface and the second inclined outer surface.

17 Claims, 8 Drawing Sheets

(56)        References Cited

U.S. PATENT DOCUMENTS

| | | | |
|---|---|---|---|
| 2021/0041656 A1* | 2/2021 | Miyasaka ................ | G02B 1/11 |
| 2021/0103119 A1* | 4/2021 | Reckker ................. | G02B 7/025 |
| 2022/0221682 A1 | 7/2022 | Yang et al. | |
| 2022/0317410 A1* | 10/2022 | Yang ..................... | G02B 7/003 |
| 2023/0194828 A1* | 6/2023 | Reckker ................. | H04N 23/51 |
| | | | 348/148 |
| 2023/0408736 A1 | 12/2023 | Yang et al. | |

FOREIGN PATENT DOCUMENTS

| | | | |
|---|---|---|---|
| KR | 10-2022-0024343 A | 3/2022 | |
| KR | 10-2023-0173878 A | 12/2023 | |

* cited by examiner $$\frac{d1}{D1} \geq 0.9$$

$$\frac{d2}{D2} \geq 0.9$$

300c
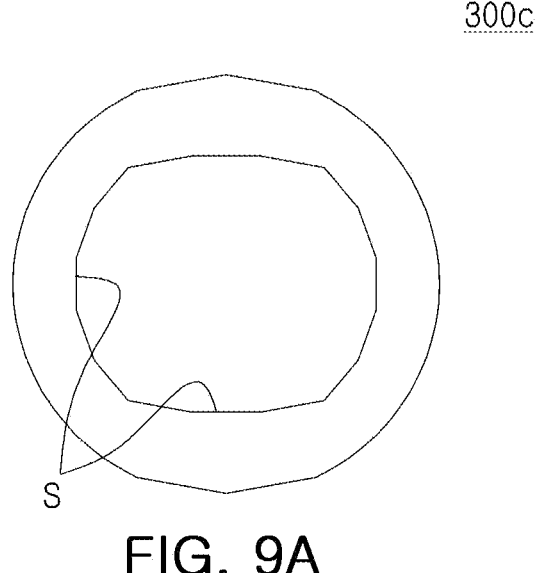
FIG. 9A
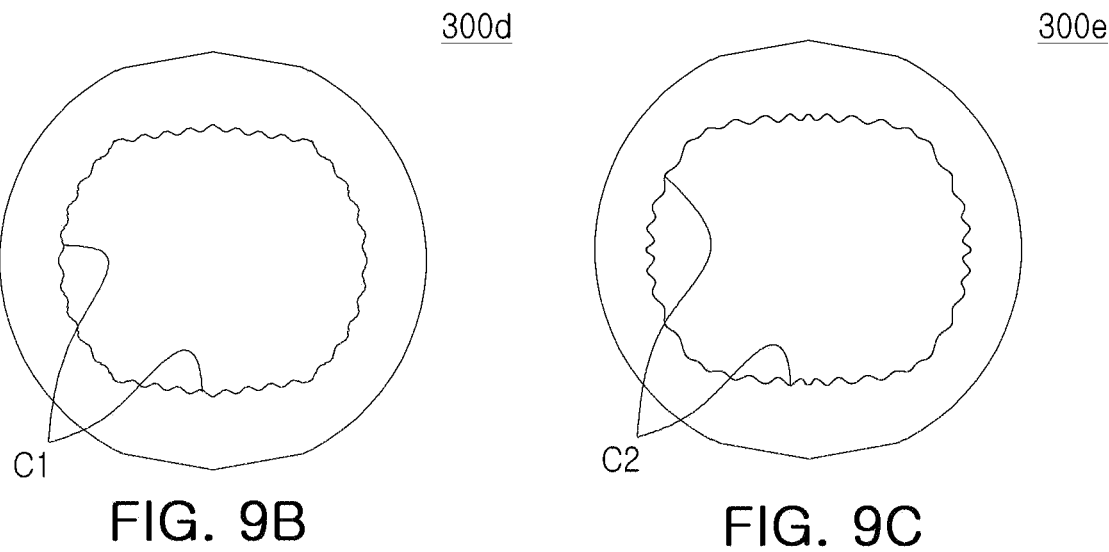
FIG. 9B
FIG. 9C

LENS ASSEMBLY

CROSS-REFERENCE TO RELATED APPLICATION

This application claims the benefit under 35 USC § 119(a) of Korean Patent Application No. 10-2023-0000402, filed on Jan. 2, 2023, in the Korean Intellectual Property Office, the entire disclosure of which is incorporated herein by reference for all purposes.

BACKGROUND

1. Field

The present disclosure relates to a lens assembly.

2. Description of Related Art

In general, a camera module may be installed in a portable communication terminal such as a mobile phone, a PDA, a portable PC, and the like.

The camera module may include a lens assembly in which a plurality of lenses are stacked, and light passing through the plurality of lenses may be collected by an image sensor and stored as data in a memory of a device.

Recently, the optical performance of a camera module has been improved by disposing a free-curved lens in a lens module. Since the surface of an optical unit of the free-curved lens can be freely changed, the degree to which light is refracted within the lens assembly may vary greatly. Therefore, in a process in which a free-curved lens is disposed in a lens barrel, if a dispositional direction of the free-curved lens is reversed, the resolution of a camera module including the lens barrel may be problematic.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a lens assembly includes a plurality of lenses including an anti-rotation lens having a flange portion extending along at least a portion of a circumference of the anti-rotation lens, wherein the flange portion includes a first inclined outer surface extending in a first direction from a first outer point on a side surface of the flange portion and a second inclined outer surface extending in a second direction different from the first direction from the first outer point; and a lens barrel configured to accommodate the plurality of lenses, the lens barrel including a first coupling portion configured to contact the first inclined outer surface and the second inclined outer surface.

The first inclined outer surface and the second inclined outer surface may form an obtuse angle.

The flange portion may further include a third inclined outer surface extending in a third direction from a second outer point on the side surface of the flange portion opposite to the first outer point and a fourth inclined outer surface extending in a fourth direction different from the third direction. The lens barrel may further include a second coupling portion configured to contact the third inclined outer surface and the fourth inclined outer surface.

The at least one of the plurality of lenses may satisfy the following Equation 1:

$$\frac{9}{10} \le \frac{d1}{D1},$$

where d1 is a distance between the first outer point and the second outer point, and D1 is an outer diameter of the anti-rotation lens.

The third inclined outer surface and the fourth inclined outer surface may form an obtuse angle.

The lens assembly may further include a spacer configured to contact the anti-rotation lens, the spacer including a fifth inclined outer surface extending in a fifth direction from a third outer point on an outer surface of the spacer and a sixth inclined outer surface extending in a sixth direction different from the fifth direction from the arbitrary third outer point. The fifth inclined outer surface and the sixth inclined outer surface may contact the first coupling portion. The fifth inclined outer surface and the sixth inclined outer surface may form an obtuse angle.

The lens assembly may further include a spacer configured to contact the anti-rotation lens, the spacer including a fifth inclined outer surface extending in a fifth direction from a third outer point on an outer surface of the spacer and a sixth inclined outer surface extending in a sixth direction different from the fifth direction from the arbitrary third outer point, and a seventh inclined outer surface extending in a seventh direction a fourth outer point disposed opposite to the third outer point and an eighth inclined outer surface extending in an eighth direction from the fourth outer point. The fifth inclined outer surface and the sixth inclined outer surface may contact the first coupling portion, and the seventh inclined outer surface and the eighth inclined outer surface may contact the second coupling portion.

The spacer may satisfy Equation 2:

$$\frac{9}{10} \le \frac{d2}{D2},$$

where d2 is a distance between the third outer point and the fourth outer point, and D2 is an outer diameter of a spacer.

The anti-rotation lens may be a free-curved lens including a free-curved surface.

In another general aspect, a lens assembly includes a plurality of lenses disposed along an optical axis; a spacer configured to contact at least one of the plurality of lenses; a lens barrel configured to accommodate the plurality of lenses and the spacer; and an image sensor in which light is formed. A periphery of each of the spacer and the at least one of the plurality of lenses includes at least four inclined outer surfaces. The lens barrel includes coupling portions configured to contact the plurality of inclined outer surfaces. The spacer includes a first inclined inner surface extending in a first direction from a first inner point on an inner surface of the spacer and a second inclined inner surface extending in a second direction different from the first direction from the arbitrary first inner point, and a third inclined inner surface extending in a third direction from a second inner point disposed opposite to the first inner point and a fourth inclined inner surface extending in a fourth direction different from the third direction from the second inner point.

Each of the at least four inclined outer surfaces may be linear.

An inclined outer surface of the at least one of the plurality of lenses may be disposed to face an inclined outer surface of the spacer.

The first inclined inner surface and the second inclined inner surface may form an obtuse angle, and the third inclined inner surface and the fourth inclined inner surface may form an obtuse angle.

The inner surface of the spacer may include a first arc surface connecting the first inclined inner surface and the third inclined inner surface, and a second arc surface connecting the second inclined inner surface and the fourth inclined inner surface.

The first inner point and the second inner point may be disposed to face each other in a minor axis direction of the image sensor.

The inner surface of the spacer may include a fifth inclined inner surface in contact with the second inclined inner surface, and a sixth inclined inner surface in contact with the fourth inclined inner surface.

Other features and aspects will be apparent from the following detailed description, the drawings, and the claims.

BRIEF DESCRIPTION OF DRAWINGS

FIGS. 9A to 9C are plan views of each spacer according to another embodiment of the present disclosure.

Figure 1:
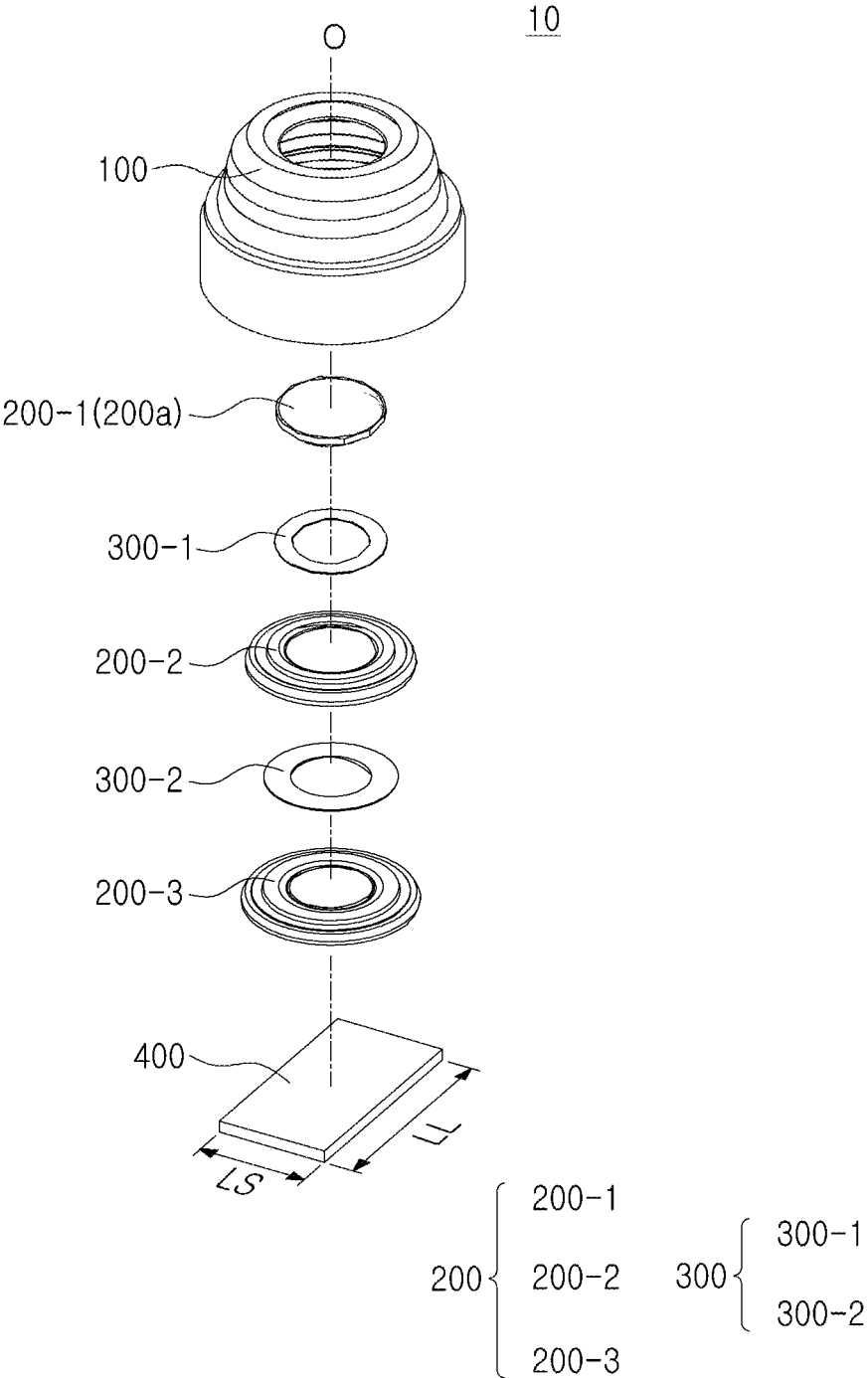
FIG. 1 is an exploded perspective view illustrating a lens assembly.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Due to manufacturing techniques and/or tolerances, variations of the shapes shown in the drawings may occur. Thus, the examples described herein are not limited to the specific shapes shown in the drawings, but include changes in shape that occur during manufacturing.

Unless otherwise defined, all terms, including technical and scientific terms, used herein have the same meaning as commonly understood by one of ordinary skill in the art to which this disclosure pertains specifically in the context on an understanding of the disclosure of the present application. Terms, such as those defined in commonly used dictionaries, are to be interpreted as having a meaning that is consistent with their meaning in the context of the relevant art and specifically in the context of the disclosure of the present application, and are not to be interpreted in an idealized or overly formal sense unless expressly so defined herein.

In addition, in the following description, expressions such as upper side, upper portion, lower side, lower portion, side surface, front surface, rear surface, and the like, are expressed based on the direction shown in the drawing, and if the direction of the object is changed, it is stated in advance that it may be expressed differently.

FIG. 1 is an exploded perspective view illustrating a lens assembly.

Referring to FIG. 1, a lens assembly 10, according to an embodiment of the present disclosure, may include a plurality of lenses 200, a lens barrel 100, a spacer 300, and an image sensor 400, disposed along an optical axis O.

The plurality of lenses 200 may be sequentially disposed on the lens barrel 100 along the optical axis O, and may be sequentially stacked along an optical axis O. Referring to FIG. 1, first through third lenses 200-1, 200-2, and 200-3 stacked along an optical axis O are shown, but the spirit of the present disclosure is not limited to the number of lenses. For example, more lenses may be further included according to the degree of resolution to be implemented. The plurality of lenses 200 may be stacked in any amount as desired, according to the design of a lens module, and each of the plurality of lenses 200 may have the same or different optical characteristics, such as the same or different refractive indices, or the like.

The plurality of lenses 200 may be formed of glass, glass molding, a thermosetting resin, a thermoplastic resin, or a plastic material, but an embodiment of the present disclosure is not limited thereto.

At least one of the plurality of lenses 200 may include an anti-rotation lens 200a. The anti-rotation lens 200a may include a plurality of inclined outer surfaces formed on the outer surface of the lens. The position of the anti-rotation lens 200a is not limited to the position of the first lens 200-1 shown in FIG. 1, and may be changed.

A spacer 300 may be disposed between the plurality of lenses 200 to maintain an interval between the lenses.

One or more spacers 300 may be provided based on the number of lenses. The spacer 300 may be disposed between two lenses adjacently disposed among the plurality of lenses 200, so that the plurality of lenses 200 may be disposed to be spaced apart from each other by a predetermined interval. For example, the spacer 300 may be interleaved between adjacent ones of the plurality of lenses 200. The thickness of the spacer 300 disposed in an interval between the plurality of lenses 200 may be determined based on the interval between the plurality of lenses 200.

A light shielding material may be coated or a light shielding film may be attached to the spacer 300 to prevent undesired light from passing through the spacer 300.

The spacer 300 may be formed of an opaque material, and may be made of a non-ferrous metal such as copper or aluminum.

Referring to FIG. 1, a spacer 300 may be disposed between an anti-rotation lens 200a and an adjacent lens. The spacer 300 in contact with the anti-rotation lens 200a may include a plurality of cutting portions on an outer surface thereof.

In order to fix the plurality of lenses 200 to the lens barrel 100, press-fitting or bonding by an adhesive may be used.

The image sensor 400 may form an image of light passing through the plurality of lenses 200. The image sensor 400 may have a rectangular shape.

Figure 2:
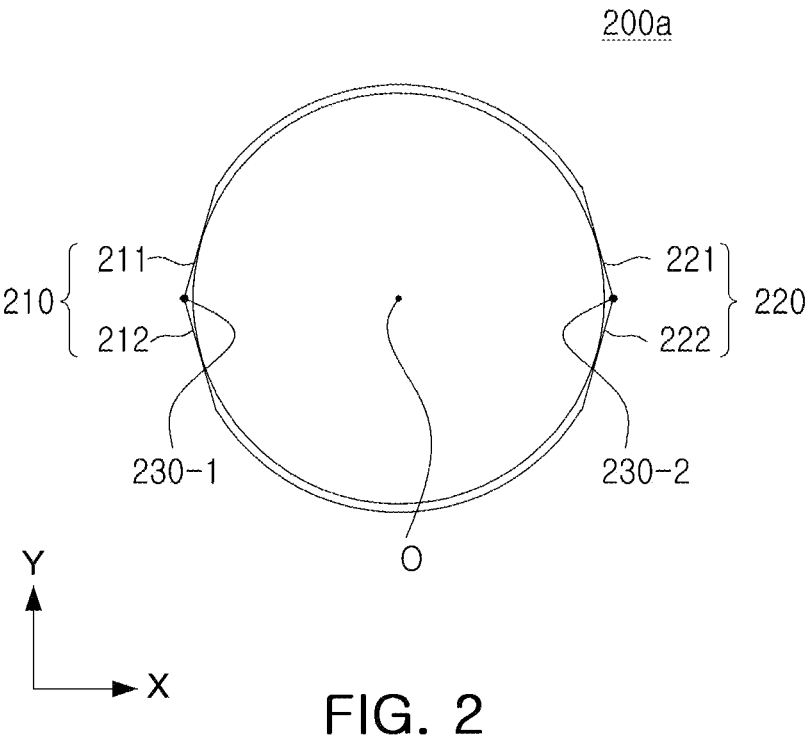
FIG. 2 is a plan view of an anti-rotation lens according to an embodiment of the present disclosure.
Figure 3:
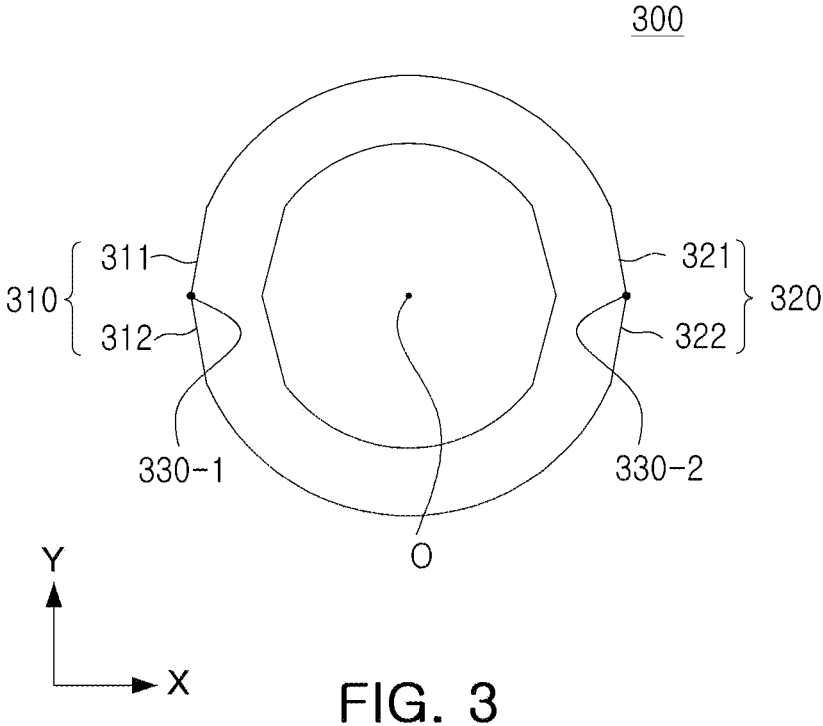
FIG. 3 is a plan view of a spacer according to an embodiment of the present disclosure.

FIG. 2 is a plan view of an anti-rotation lens according to an embodiment of the present disclosure. FIG. 3 is a plan view of a spacer according to an embodiment of the present disclosure. FIG. 4 is a perspective view and a plan view of a lens barrel according to an embodiment of the present disclosure. FIG. 5 is a perspective view of a lens, a spacer, and a lens barrel according to an embodiment of the present disclosure.

Referring to FIGS. 1 and 2, the plurality of lenses 200 may include an optical unit and a flange portion through which light passes and is refracted.

The optical unit may refract light reflected from a subject. To this end, the optical unit may have a concave, convex or meniscus shape.

The flange portion may be formed at an edge of the optical unit, and the flange portion may be a portion in contact with the lens barrel 100 or the spacer 300. In addition, a light-blocking material may be coated or a light-blocking film may be attached to the flange portion to prevent undesired light from passing through the flange portion. The optical unit may be an anti-rotation lens 200a.

The anti-rotation lens 200a may be a free-curved lens in which a free-curved surface is formed in an optical portion of the anti-rotation lens 200a. The shape of the free-curved lens can be freely changed in the optical unit, and the thickness of the free-curved lens can be freely changed when moved in an X-axis and a Y-axis. For example, the shape of an effective surface of the free curved lens may vary along the X-axis and the Y-axis, and the effective surface may be formed asymmetrically with respect to an optical axis. That is, the focal length of the free curved lens may vary greatly depending on the position on which light is incident. Accordingly, the performance of the free-curved lens may vary depending on the direction in which the free-curved lens is assembled to the lens barrel 100.

In a process of disposing the anti-rotation lens 200a on a lens assembly 10, when the anti-rotation lens 200a rotates or twists, a problem may occur in the resolution of the lens assembly 10. In addition, when the anti-rotation lens 200a is a free curved lens, the problem of resolution may become more severe. However, according to an embodiment of the present disclosure, the anti-rotation lens 200a may be fixed to the lens barrel 100 so as not to rotate, and a constant resolution may be provided.

Referring to FIG. 2, the anti-rotation lens 200a may include a plurality of inclined outer surfaces 210 and 220 formed on a flange portion.

The flange portion of the anti-rotation lens 200a may include a first inclined outer surface 211 extending in one direction and a second inclined outer surface 212 extending in the other direction from an arbitrary first outer point 230-1 on a side surface of the flange portion. According to an embodiment of the present disclosure, the first inclined outer surface 211 and the second inclined outer surface 212 may be formed in contact with an optical unit at the first outer point 230-1, and the first inclined outer surface 211 and the second inclined outer surface 212 may form an obtuse angle.

The flange portion of the anti-rotation lens 200a may include a third inclined outer surface 221 extending in one direction, and a fourth inclined outer surface 222 extending in the other direction from a second outer point 230-2, disposed opposite to the first outer point 230-1, with respect to an optical axis O.

According to an embodiment of the present disclosure, the third inclined outer surface 221 and the fourth inclined outer surface 222 may be formed in a form in contact with an optical unit at the second outer point 230-2, and the third inclined outer surface 221 and the fourth inclined outer surface 222 may form an obtuse angle. According to an embodiment of the present disclosure, the first to fourth inclined outer surfaces 211, 212, 221, and 222 may have cross-sections inclined in a direction perpendicular to an optical axis O. Since the first inclined outer surface 211 and the second inclined outer surface 212 may be formed in a form extending from the first outer point 230-1, respectively, and the third inclined outer surface 221 and the fourth inclined outer surface 222 may be formed in a form extending from the second outer point 230-2, respectively, the flange portion of the anti-rotation lens 200a may include 'V'-shaped inclined surfaces on one side and the other side thereof. The first inclined outer surface 211 and the third inclined outer surface 221 may be connected to each other through an arc surface formed on the remaining flange portion, and the second inclined outer surface 212 and the fourth inclined outer surface 222 may be connected to each other through an arc surface formed on the remaining flange portion.

The shape of the anti-rotation lens 200a is not limited to those described above, and may include only a first inclined outer surface 211 and a second inclined outer surface 212 formed on the flange portion (or outer surface). Alternatively, the flange portion (or outer surface) of the anti-rotation lens 200a may have a shape including four or more inclined outer surfaces.

In an embodiment of the present disclosure, the first outer point 230-1 and the second outer point 230-2 may be disposed in a symmetrical position with respect to an optical axis O. Here, symmetry does not mean only perfect symmetry, but may mean symmetry including tolerance during manufacturing.

The anti-rotation lens 200a according to an embodiment of the present disclosure may be integrally injection-molded to include a plurality of inclined outer surfaces 210 and 220, or may be manufactured by being cut from a circular lens.

Referring to FIG. 3, a spacer 300 may include an incident hole to adjust the amount of light passing through a plurality of lenses 200. For example, an incident hole may be formed on the inner surface of the spacer 300, and light incident through the plurality of lenses 200 may pass through the incident hole.

The size of the incident hole may be determined based on the degree to which light passing through the plurality of lenses 200 is refracted, and may be formed to such an extent that light refracted while passing through the plurality of lenses 200 may be incident to the image sensor.

The inner surface of the spacer 300 surrounding the incident hole may include a plurality of inclined inner surfaces and a plurality of arc surfaces, but the present disclosure is not limited thereto. The inner surface of the spacer 300 will be described later in detail with reference to FIGS. 8 to 10.

The spacer 300 may include a plurality of inclined outer surfaces 310 and 320 formed on the outer surface of the spacer 300. The plurality of inclined outer surfaces 310 and 320 may be formed on one side and the other side of the spacer 300.

The spacer may include a fifth inclined outer surface 311 extending in one direction and a sixth inclined outer surface 312 extending in the other direction from an arbitrary third outer point 330-1 on an outer surface of the spacer. According to an embodiment of the present disclosure, the fifth inclined outer surface 311 and the sixth inclined outer surface 312 may meet at the third outer point 330-1 and may form an obtuse angle with each other.

The spacer 300 may include a seventh inclined outer surface 321 extending in one direction and an eighth inclined outer surface 322 extending in the other direction from a fourth outer point 330-2, disposed opposite to the third outer point 330-1, with respect to an optical axis O on the outer surface of the spacer. According to an embodiment of the present disclosure, the seventh inclined outer surface 321 and the eighth inclined outer surface 322 may meet at the fourth outer point 330-2 and form an obtuse angle.

According to an embodiment of the present disclosure, fifth to eighth inclined outer surfaces 311, 312, 321, and 322 may have cross-sections inclined in a direction perpendicular to the optical axis O. The fifth inclined outer surface 311 and the sixth inclined outer surface 312 may be formed in a form extending from the third outer point 330-1, respectively, and the seventh inclined outer surface 321 and the eighth inclined outer surface 322 may have a form extending from the fourth outer point 330-2, respectively, the spacer 300 may include a 'V'-shaped inclined surface on one side and the other side thereof. The fifth inclined outer surface 311 and the seventh inclined outer surface 321 may be connected to each other through an arc surface formed on the remaining outer surfaces, and the sixth inclined outer surface 312 and the eighth inclined outer surface 322 may be connected to each other through an arc surface formed on the remaining outer surfaces.

The shape of the spacer 300 is not limited to those described above, and the spacer 300 may include only the fifth inclined outer surface 311 and the sixth inclined outer surface 312 formed on a flange portion (or an outer surface). Alternatively, the outer surface of the spacer 300 may have a shape including four or more inclined outer surfaces.

In an embodiment of the present disclosure, the third outer point 330-1 and the fourth outer point 330-2 may be disposed in a symmetrical position with respect to the optical axis O. Here, symmetry does not mean only perfect symmetry, but may mean symmetry including tolerances during manufacturing.

Figure 4A:
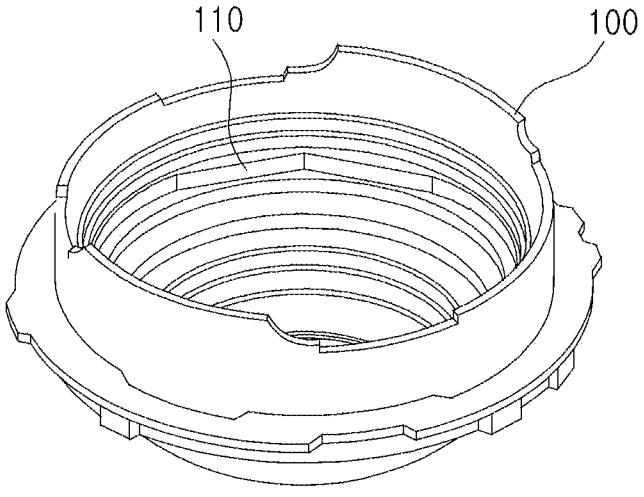
FIG. 4A is a perspective view according to an embodiment of the present disclosure.
Figure 4B:
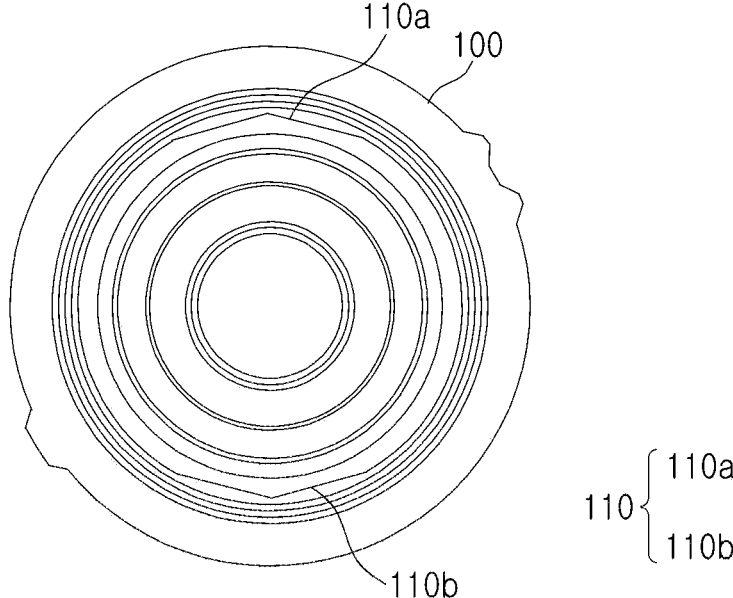
FIG. 4B is a plan view of a lens barrel according to an embodiment of the present disclosure.
Figure 5:
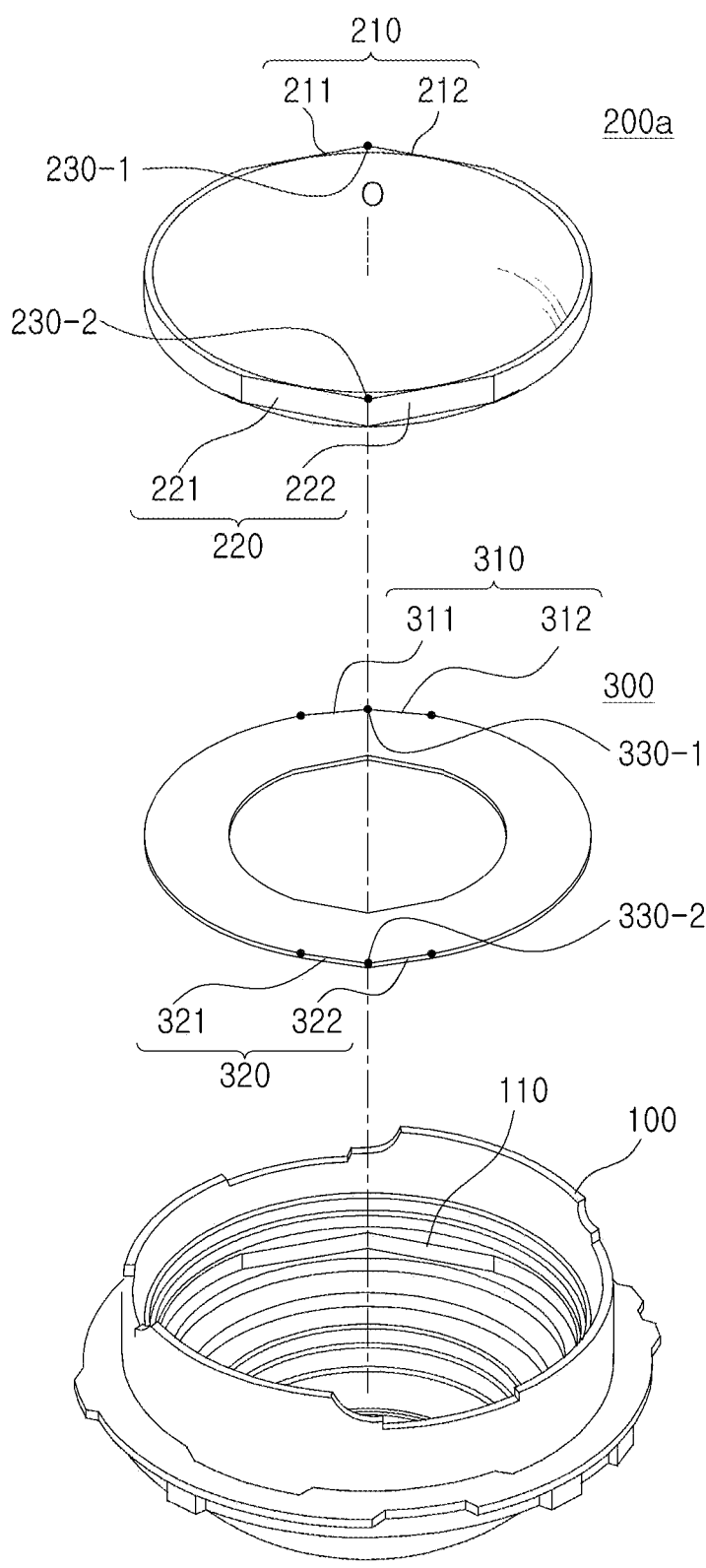
FIG. 5 is a perspective view of a lens, a spacer, and a lens barrel according to an embodiment of the present disclosure.

FIG. 4A is a perspective view of a lens barrel 100 according to an embodiment of the present disclosure, FIG. 4B is a plan view of a lens barrel 100 according to an embodiment of the present disclosure. FIG. 5 is a perspective view illustrating an anti-rotation lens 200a, a spacer 300, and a lens barrel 100.

Referring to FIGS. 4A and 4B, the lens barrel 100 may include a coupling portion 110 disposed to face a plurality of inclined outer surfaces 210 and 220 formed on a flange portion (or an outer surface) of the anti-rotation lens 200a.

For example, the coupling portion 110 of the lens barrel 100 may include a first coupling portion 110*a* and a second coupling portion 110*b*, and the first coupling portion 110*a* and the second coupling portion 110*b* may respectively be formed in a 'V' shape. The first coupling portion 110*a* may be disposed on one side of the lens barrel 100, and the second coupling portion 110*b* may be formed on an opposite side of the first coupling portion 110*a* with respect to the optical axis O.

The anti-rotation lens 200*a*, the spacer 300, and the lens barrel 100 may be stacked in a direction of the optical axis O. As described above in FIGS. 2 and 3, a flange portion of the anti-rotation lens 200*a* may include a plurality of inclined outer surfaces 210 and 220, and an outer surface of the spacer 300 may include a plurality of inclined outer surfaces 310 and 320.

The plurality of inclined outer surfaces 210 and 220 of the anti-rotation lens 200*a* and the plurality of inclined outer surfaces 310 and 320 of the spacer 300 may be disposed to face each other. For example, the first inclined outer surface 211 may face the fifth inclined outer surface 311, and the second inclined outer surface 212 may face the sixth inclined outer surface 312. The third inclined outer surface 221 may face the seventh inclined outer surface 321, and the fourth inclined outer surface 222 may face the eighth inclined outer surface 322. In addition, the first outer point 230-1 may face the third outer point 330-1, and the second outer point 230-2 may face the fourth outer point 330-2. In an embodiment of the present disclosure, a distance between the first outer point 230-1 and the third outer point 330-1 may be the same as a distance between the second outer point 230-2 and the fourth outer point 330-2.

Conventionally, lenses had a circular shape and was fixed to the lens barrel by an adhesive. When the adhesive is deformed, the lens rotates based on the optical axis, which may drastically change the resolution of the lens assembly.

According to an embodiment of the present disclosure, the flange portion of the anti-rotation lens 200*a* may include inclined outer surfaces 210 and 220 having an inclined cross-section. The inclined outer surfaces 210 and 220 may remain in a state of contact with the coupling portion 110 of the lens barrel 100, and prevent the anti-rotation lens 200*a* from rotating within the lens barrel 100 with respect to the optical axis O. Specifically, the first inclined outer surface 211 and the second inclined outer surface 212 may contact the first coupling portion 110*a*, and the third inclined outer surface 221 and the fourth inclined outer surface 222 may contact the second coupling portion 110*b*.

In an embodiment of the present disclosure, a plurality of inclined outer surfaces 310 and 320 of the spacer 300 may also be disposed to face the coupling portion 110 of the lens barrel 100, and contact the coupling portion 110. Similarly, the inclined outer surfaces 310 and 320 may remain in contact with the coupling portion 110 of the lens barrel 100, and may prevent the spacer 300 with respect to the optical axis O within the lens barrel 100. Specifically, the fifth inclined outer surface 311 and the sixth inclined outer surface 312 may contact the first coupling portion 110*a*, and the seventh inclined outer surface 321 and the eighth inclined outer surface 322 may contact the second coupling portion 110*b*. Accordingly, according to an embodiment of the present disclosure, the spacer 300 may be fixed to the lens barrel 100 and not rotate with respect to the optical axis O. As will be described later, an inner surface of the spacer 300 may be formed in a non-circular shape. That is, in an embodiment of the present disclosure, the inner surface of the spacer 300 may be freely deformed by preventing the spacer 300 from rotating with respect to the optical axis O within the lens barrel 100.

In FIGS. 2 to 5, an embodiment in which the anti-rotation lens 200*a* has four inclined outer surfaces formed therein, is illustrated, but it is not limited to only a shape having four inclined outer surfaces. For example, the anti-rotation lens 200*a* may have only the first inclined outer surface 211 and the second inclined outer surface 212 on a flange portion (or an outer surface), or may include four or more inclined outer surfaces. Similarly, an embodiment in which the spacer 300 has four inclined outer surfaces formed on an outer surface thereof, is illustrated, but is not limited to a shape having four inclined outer surfaces. For example, the spacer 300 may have only the fifth inclined outer surface 311 and the sixth inclined outer surface 312 on the outer surface thereof, or may include four or more inclined outer surfaces.

Even when the anti-rotation lens 200*a* and the spacer 300 include at least four inclined outer surfaces on outer surfaces thereof, the inclined outer surface of the anti-rotation lens 200*a* and the inclined outer surface of the spacer 300 may be disposed to face each other, respectively. In addition, the coupling portion 110 of the lens barrel 100 may be formed to correspond to the inclined outer surfaces of the anti-rotation lens 200*a* and the spacer 300. The inclined outer surface of the anti-rotation lens 200*a* and the inclined outer surface of the spacer 300 may contact the coupling portion 110 of the lens barrel 100.

Figure 6:
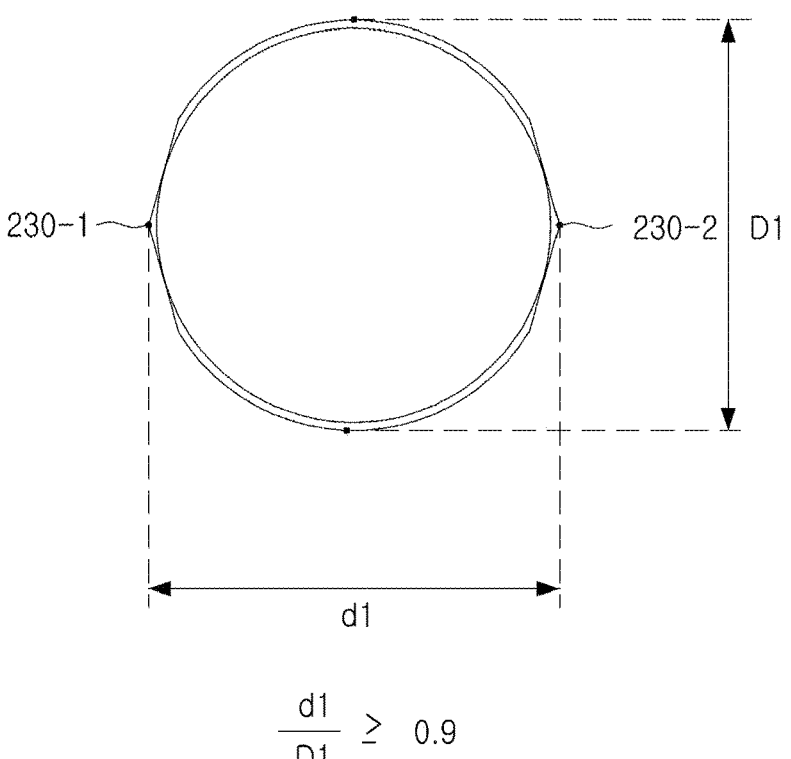
FIG. 6 is a plan view of an anti-rotation lens according to an embodiment of the present disclosure.
Figure 7:
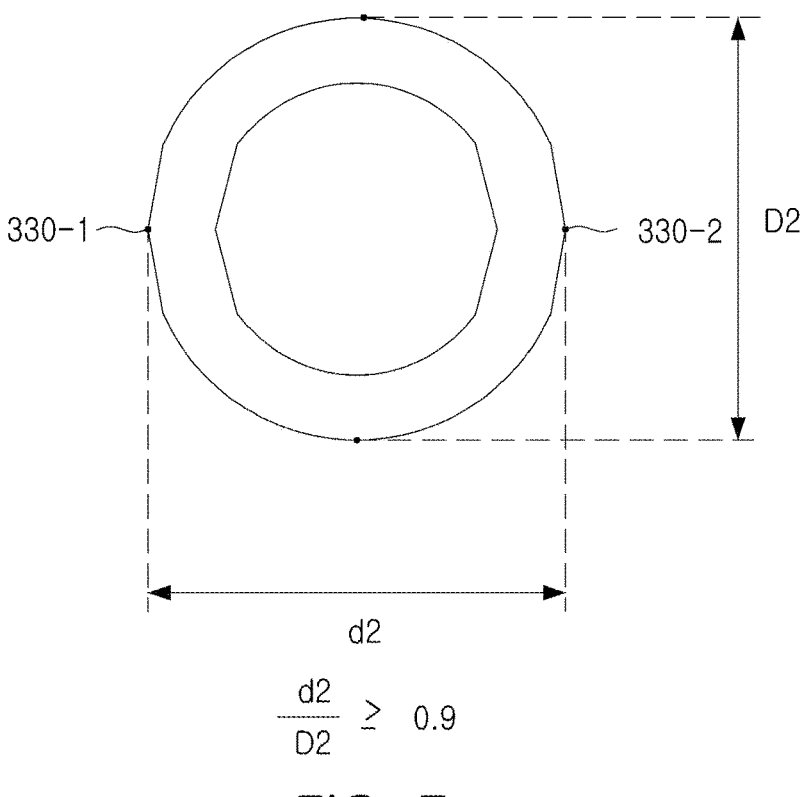
FIG. 7 is a plan view of a spacer according to an embodiment of the present disclosure.

FIG. 6 is a plan view of an anti-rotation lens according to an embodiment of the present disclosure. FIG. 7 is a plan view of a spacer according to an embodiment of the present disclosure.

Referring to FIG. 6, an anti-rotation lens 200*a* may have inclined outer surfaces 210 and 220 so as to satisfy the following [Equation 1].

$$\frac{9}{10} \leq \frac{d1}{D1} \qquad \text{[Equation 1]}$$

where d1 is a distance between a first outer point and a second outer point, and D1 is an outer diameter of an anti-rotation lens.

In the above [Equation 1], d1 may mean a distance between a first outer point 230-1 and a second outer point 230-2, and D1 means an outer diameter of an anti-rotation lens 200*a*.

The outer diameter of the anti-rotation lens 200*a* may mean a diameter of a circular flange portion.

Referring to FIG. 7, a spacer 300 may have inclined outer surfaces 310 and 320 so as to satisfy the following [Equation 2].

$$\frac{9}{10} \leq \frac{d2}{D2} \qquad \text{[Equation 2]}$$

where d2 is a distance between a third outer point and a fourth outer point, and D2 is an outer diameter of a spacer)

In the above [Equation 2], d2 may mean a distance between a third outer point 330-1 and a fourth outer point 330-2, and D2 means an outer diameter of a spacer 300.

The outer diameter of the spacer 300 may mean a diameter of a circular outer surface.

Figure 10:
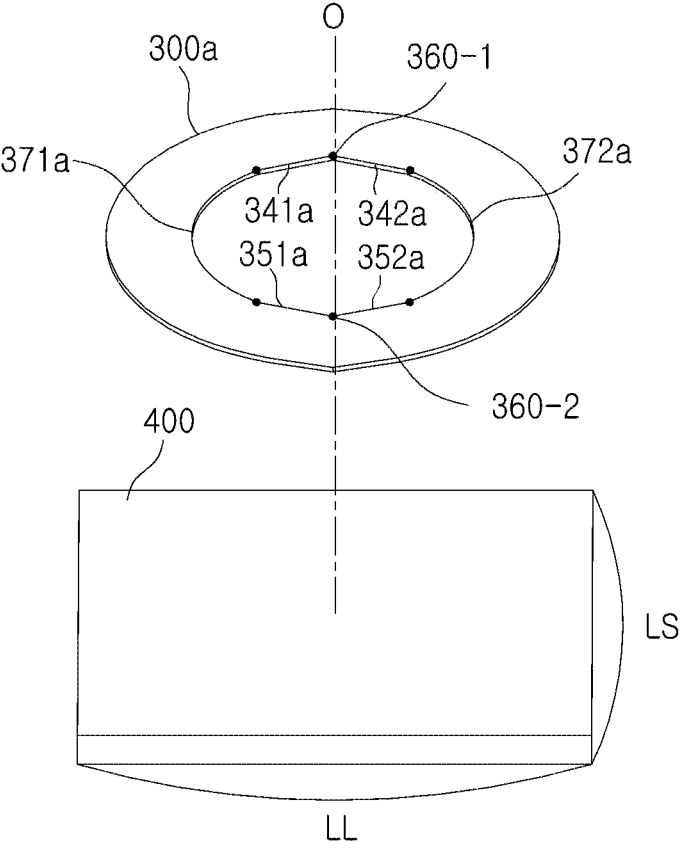
FIG. 10 is a perspective view of a spacer and an image sensor according to an embodiment of the present disclosure.

FIG. 8 is a plan view of a spacer according to an embodiment of the present disclosure. FIG. 9 is a plan view of a spacer according to another embodiment of the present disclosure. FIG. 10 is a perspective view of a spacer and an image sensor according to an embodiment of the present disclosure.

An incident hole may be formed on the inner surface of the spacer 300 to pass through the spacer 300, and light passing through the incident hole may be reflected from the inner surface of the spacer 300. When light is reflected from the inner surface of the spacer 300 and is incident on an image sensor 400, image quality may deteriorate.

According to an embodiment of the present disclosure, the shape of the inner surface of the spacer may be variously changed, to adjust light reflected from the inner surface of the spacer and incident on the image sensor 400. Therefore, it is possible to prevent a flare phenomenon from occurring in a lens assembly.

FIGS. 8 and 9 illustrate plan views of spacers 300a, 300b, 300c, 300d, and 300e according to various embodiments of the present disclosure.

Figure 8A:
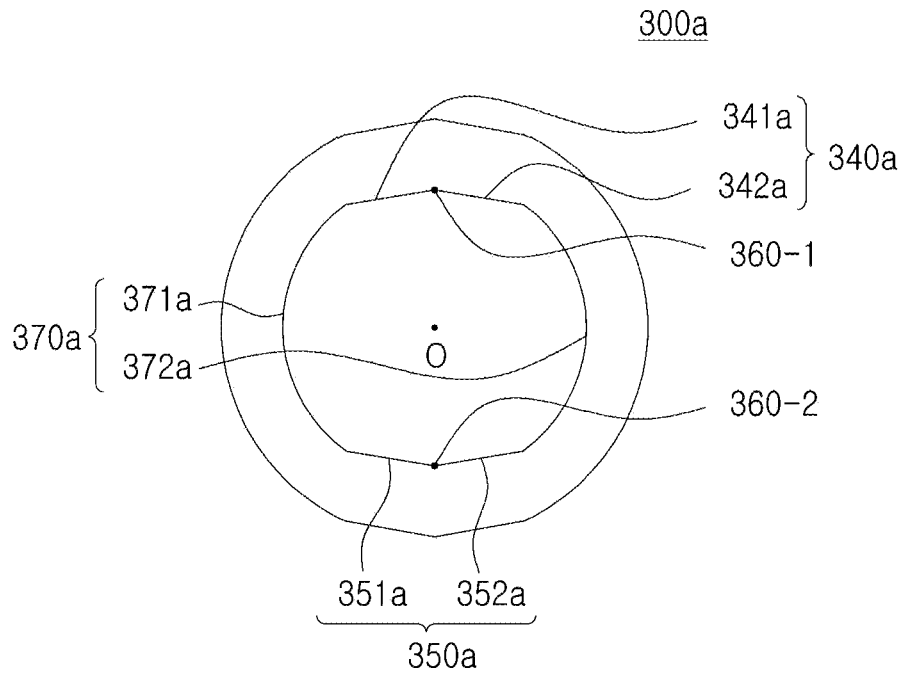
FIGS. 8A to 8B are plan views of each spacer according to an embodiment of the present disclosure.

Referring to FIG. 8A, a spacer 300a according to an embodiment of the present disclosure may include inclined inner surfaces 340a and 350a formed on an inner surface of the spacer 300a. The inclined inner surfaces 340a and 350a may be formed on one side and the other side of the inner surface of the spacer 300a.

The inclined inner surfaces 340a and 350a may include a first inclined inner surface 341a extending in one direction and a second inclined inner surface 342a extending in the other direction from an arbitrary first inner point 361-1 on an inner surface of the spacer 300a, and a third inclined inner surface 351a extending in one direction and a fourth inclined surface 352a extending in the other direction from a second inner point 360-2, disposed opposite to the first inner point 360-1, with respect to an optical axis. For example, the first inclined inner surface 341a and the second inclined inner surface 342a may be formed on one side of the inner surfaces of the spacer 300a, and the third inclined inner surface 351a and the fourth inclined inner surface 352a may be formed on the other side of the inner surface of the spacer 300a. In this case, the first inner point 360-1 and the second inner point 360-2 may be symmetrical to each other with respect to the optical axis O.

The inclined inner surfaces 340a and 350a may be connected to each other through an arc surface 370a, respectively. For example, a first arc surface 371a of the arc surface 370a may connect the first inclined inner surface 341a and the third inclined inner surface 351a, and the second arc surface 372a of the arc surface 370a may connect the second inclined inner surface 342a and the fourth inclined inner surface 352a.

Figure 8B:
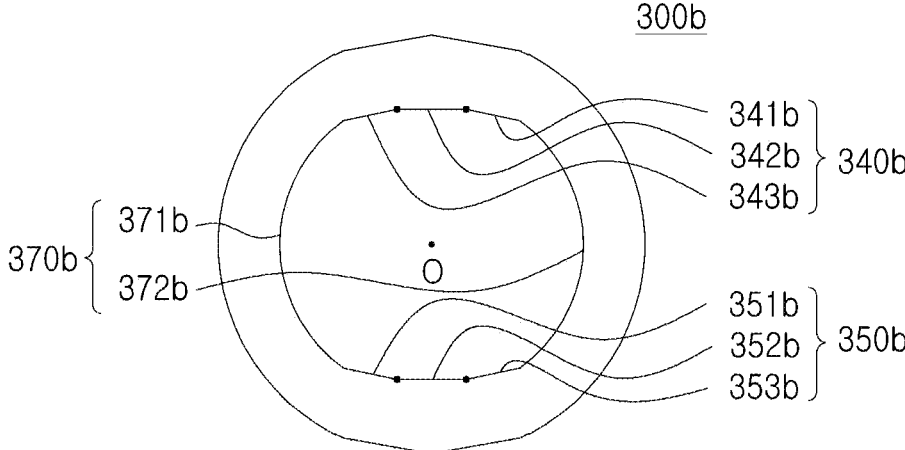

Referring to FIG. 8B, a spacer 300b according to another embodiment of the present disclosure may include inclined inner surfaces 340b and 350b and an arc surface 370b formed on an inner surface of the spacer 300b. The inclined inner surfaces 340b and 350b may be formed on one side and the other side of the inner surface of the spacer 300b.

The inclined inner surface 340b may include a first inclined inner surface 341b extending in one direction a second inclined inner surface 342b extending in the other direction from an arbitrary inner point on an inner surface of the spacer 300b, and a fifth inclined inner surface 343b in contact with the second inclined inner surface 342b. In addition, the inclined inner surface 350b may include a third inclined inner surface 351b extending in one direction from another inner point of the inner surface of the spacer 300b, a fourth inclined inner surface 352b extending in the other direction, and a sixth inclined inner surface 353b in contact with the fourth inclined inner surface 352b. For example, the first inclined inner surface 341b, the second inclined inner surface 342b, and the fifth inclined inner surface 343b may be formed on one side of the inner surfaces of the spacer 300b, and the third inclined inner surface 351b, the fourth inclined inner surface 352b, and the sixth inclined inner surface 353b may be formed on the other side of the inner surfaces of the spacer 300b.

The first inclined inner surface 341b and the third inclined inner surface 351b may be connected to each other through an arc surface 371b, and the fifth inclined inner surface 343b and the sixth inclined inner surface 353b may be connected to each other through an arc surface 372b.

Referring to 9A, a spacer 300c according to another embodiment of the present disclosure may include a plurality of straight line portions S formed on an inner surface of the spacer 300c. A plurality of straight portions S may be formed to surround the inner surface of the spacer 300c. For example, the plurality of straight portions S may be connected to each other, and the plurality of straight portions S may surround the inner surface of the spacer 300c.

Referring to FIG. 9B, a spacer 300d according to another embodiment of the present disclosure may include a curved portion C1 formed on an inner surface of the spacer 300d. The curved portion C1 may include a plurality of convex portions and a plurality of concave portions. Each convex portion among the plurality of convex portions and each concave portion among the plurality of concave portions may have a uniform shape. For example, the curved portion C1 may be formed in a waveform, and may be formed to surround the inner surface of the spacer 300d.

Referring to FIG. 9C, a spacer 300e according to another embodiment of the present disclosure may include a curved portion C2 formed on an inner surface of the spacer 300e. The curved portion C2 may include a plurality of convex portions and a plurality of concave portions. Each convex portion of the plurality of convex portions and each concave portion of the plurality of concave portions may be alternately and repeatedly disposed. Each convex portion among the plurality of convex portions and each concave portion among the plurality of concave portions may have various shapes. For example, each convex portion and each concave portion may have non-uniform shapes having different radii of curvature.

FIG. 10 illustrates a spacer 300a and an image sensor 400 according to an embodiment of the present disclosure.

Referring to FIG. 10, the spacer 300a and the image sensor 400 may be disposed in a direction of an optical axis O. The spacer 300a shown in FIG. 10 may have the same structure as the spacer 300a described in FIG. 8A.

Referring to FIG. 10, the image sensor 400 may have a rectangular shape including a major axis LL and a minor axis LS.

Light may be formed on the image sensor 400 by passing through an incident hole formed on an inner surface of the spacer 300a, and the spacer 300a may be relatively disposed so that the inner surface of the spacer 300a corresponds to a shape of the image sensor 400. On the inner surface of the spacer 300a according to an embodiment of the present disclosure, a distance between a first inner point 360-1 and a second inner point 360-2 may be smaller than a distance between arc surfaces 370a, and the first inner point 360-1 and the second inner point 360-2 may be disposed to face each other in a direction of the minor axis LS of the image sensor 400. In addition, a first curved portion 371a and a second curved portion 372a may be disposed to face each other in a direction of the major axis LL of the image sensor.

As set forth above, according to an embodiment of the present disclosure having such a configuration, at least one lens may be fixed to a lens barrel.

According to an embodiment of the present disclosure having such a configuration, a spacer may be fixed to a lens barrel.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A lens assembly, comprising:
a plurality of lenses comprising an anti-rotation lens having a flange portion extending along at least a portion of a circumference of the anti-rotation lens,
wherein the flange portion comprises a first inclined outer surface extending in a first direction from a first outer point on a side surface of the flange portion and a second inclined outer surface extending in a second direction different from the first direction from the first outer point; and
a lens barrel configured to accommodate the plurality of lenses, the lens barrel comprising a first coupling portion configured to contact the first inclined outer surface and the second inclined outer surface.

2. The lens assembly of claim 1, wherein the first inclined outer surface and the second inclined outer surface form an obtuse angle.

3. The lens assembly of claim 1, wherein the flange portion further comprises a third inclined outer surface extending in a third direction from a second outer point on the side surface of the flange portion opposite to the first outer point and a fourth inclined outer surface extending in a fourth direction different from the third direction, and
the lens barrel further comprises a second coupling portion configured to contact the third inclined outer surface and the fourth inclined outer surface.

4. The lens assembly of claim 3, wherein the anti-rotation lens satisfies the following Equation 1:

$$\frac{9}{10} \le \frac{d1}{D1},$$

where d1 is a distance between the first outer point and the second outer point, and D1 is an outer diameter of the anti-rotation lens.

5. The lens assembly of claim 3, wherein the third inclined outer surface and the fourth inclined outer surface form an obtuse angle.

6. The lens assembly of claim 3, further comprising:
a spacer configured to contact the anti-rotation lens, the spacer comprising a fifth inclined outer surface extending in a fifth direction from a third outer point on an outer surface of the spacer and a sixth inclined outer surface extending in a sixth direction different from the fifth direction from the arbitrary third outer point, and
a seventh inclined outer surface extending in a seventh direction a fourth outer point disposed opposite to the third outer point and an eighth inclined outer surface extending in an eighth direction from the fourth outer point,
wherein the fifth inclined outer surface and the sixth inclined outer surface contact the first coupling portion, and
the seventh inclined outer surface and the eighth inclined outer surface contact the second coupling portion.

7. The lens assembly of claim 6, wherein the spacer satisfies Equation 2:

$$\frac{9}{10} \le \frac{d2}{D2},$$

where d2 is a distance between the third outer point and the fourth outer point, and D2 is an outer diameter of a spacer.

8. The lens assembly of claim 1, further comprising:
a spacer configured to contact the anti-rotation lens, the spacer comprising a fifth inclined outer surface extending in a fifth direction from a third outer point on an outer surface of the spacer and a sixth inclined outer surface extending in a sixth direction different from the fifth direction from the arbitrary third outer point,
wherein the fifth inclined outer surface and the sixth inclined outer surface is configured to contact the first coupling portion.

9. The lens assembly of claim 8, wherein the fifth inclined outer surface and the sixth inclined outer surface form an obtuse angle.

10. The lens assembly of claim 1, wherein the anti-rotation lens is a free-curved lens including a free-curved surface.

11. A lens assembly, comprising:
a plurality of lenses disposed along an optical axis;
a spacer configured to contact at least one of the plurality of lenses;
a lens barrel configured to accommodate the plurality of lenses and the spacer; and
an image sensor,
wherein a periphery of each of the spacer and the at least one of the plurality of lenses includes at least four inclined outer surfaces,
wherein the lens barrel includes coupling portions configured to contact the at least four inclined outer surfaces,
wherein the spacer includes a first inclined inner surface extending in a first direction from a first inner point on an inner surface of the spacer and a second inclined inner surface extending in a second direction different from the first direction from the arbitrary first inner point, and a third inclined inner surface extending in a third direction from a second inner point disposed opposite to the first inner point and a fourth inclined inner surface extending in a fourth direction different from the third direction from the second inner point.

12. The lens assembly of claim 11, wherein each of the at least four inclined outer surfaces is linear.

13. The lens assembly of claim 11, wherein an inclined outer surface of the at least one of the plurality of lenses is disposed to face an inclined outer surface of the spacer.

14. The lens assembly of claim 11, wherein the first inclined inner surface and the second inclined inner surface form an obtuse angle, and the third inclined inner surface and the fourth inclined inner surface form an obtuse angle.

15. The lens assembly of claim 11, wherein the inner surface of the spacer comprises a first arc surface connecting the first inclined inner surface and the third inclined inner surface, and a second arc surface connecting the second inclined inner surface and the fourth inclined inner surface.

16. The lens assembly of claim 15, wherein the first inner point and the second inner point are disposed to face each other in a minor axis direction of the image sensor.

17. The lens assembly of claim 11, wherein the inner surface of the spacer comprises a fifth inclined inner surface in contact with the second inclined inner surface, and a sixth inclined inner surface in contact with the fourth inclined inner surface.

* * * * *